Jan. 26, 1965  R. B. ANNAT  3,167,133
POWER OPERATED HITCH PROVIDING CONSTANT WEIGHT TRANSFER
Filed Aug. 28, 1963  2 Sheets-Sheet 1

Inventor
ROBERT BUCHANAN ANNAT
By
Wolfe, Hubbard, Voit & Osann
Attorneys

United States Patent Office 3,167,133
Patented Jan. 26, 1965

3,167,133
POWER OPERATED HITCH PROVIDING CONSTANT WEIGHT TRANSFER
Robert B. Annat, Kenilworth, England, assignor to Massey-Ferguson (United Kingdom) Limited, London, England, a British company
Filed Aug. 28, 1963, Ser. No. 305,167
Claims priority, application Great Britain, Aug. 31, 1962, 33,439/62
1 Claim. (Cl. 172—7)

The present invention relates to a power operating system for a tractor hitch linkage and more particularly to a system which provides constant weight transfer from the implement to the tractor.

In the prior Bunting U.S. Patent 2,996,124 which issued on August 15, 1961, there is disclosed an improved power operating system for a tractor hitch linkage which is capable of operating in two modes and which provides for automatic shifting between the two modes automatically without care or attention on the part of the operator. In the first or "draft control" mode the device operates to vary the riding level of a ground engaging implement for maintenance of a constant draft force at the implement hitch. In the second or "position control" mode the device operates to maintain the implement at a predetermined depth in the face of variations in the draft force. It is the primary object of the present invention to provide a power operating system for a tractor hitch having an additional or "constant pressure" mode of operation so that a constant amount of the implement weight, or downward force, is borne by the tractor while permitting the other conditions such as draft force and depth of the implement to vary. Thus it is an object to provide a power operating system for a vertically movable tractor hitch linkage in which novel means are provided for maintaining a predetermined but adjustable pressure in the main actuator connected to the linkage so that a predetermined amount of the total downward force exerted by the implement is borne by the hitch linkage and hence by the supporting tractor. It is a more specific object of the present invention to provide a novel power operating system for a vertically movabe tractor hitch linkage which enables a predetermined but adjustable amount of weight to be transferred to the tractor and which may be obtained by the addition of a few simple components to an existing relatively complex draft and position control hydraulic system and which utilizes the control lever normally employed to adjust the vertical position, or depth, of the connected implement. It is another object of the invention in one of its aspects to provide means for obtaining weight transfer which utilizes existing position control elements but which may readily be disabled by simply touching a control button when the regular position control function of the apparatus is desired.

It is finally an object of the invention to provide a power operating system for a tractor hitch linkage which is simple and reliable and which may be easily and quickly installed either as a factor installation in new tractors or as a field installation in tractors already in use.

Other objects and advantages of the invention will become apparent upon reading the attached detailed description and upon reference to the drawings in which.

Figure 1:
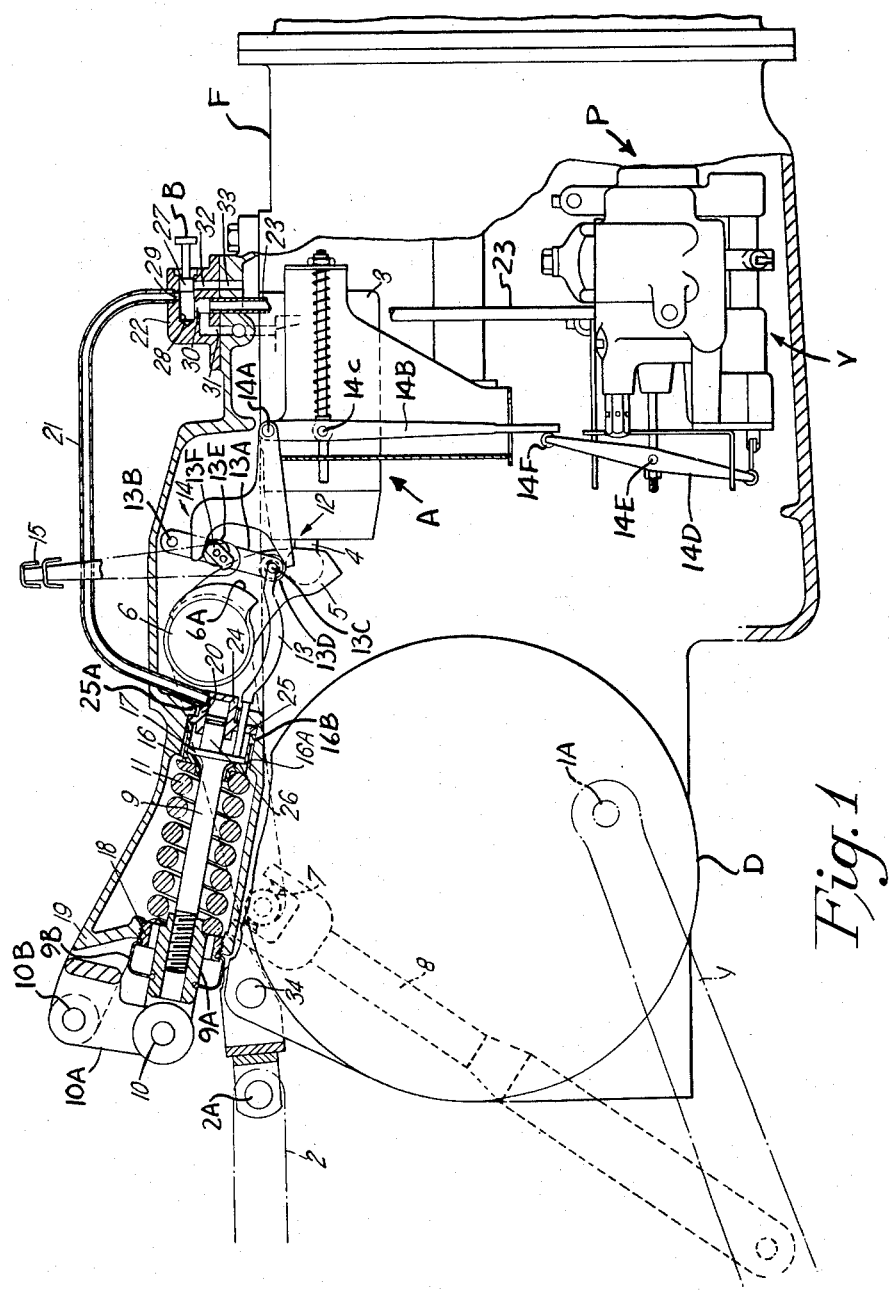
FIGURE 1 is a diagrammatic vertical section taken longitudinally through a tractor draft control system constructed in accordance with the present invention and with certain parts of the system, not directly associated with the invention, either simplified or omitted for the sake of easy understanding of the invention.
Figure 2:
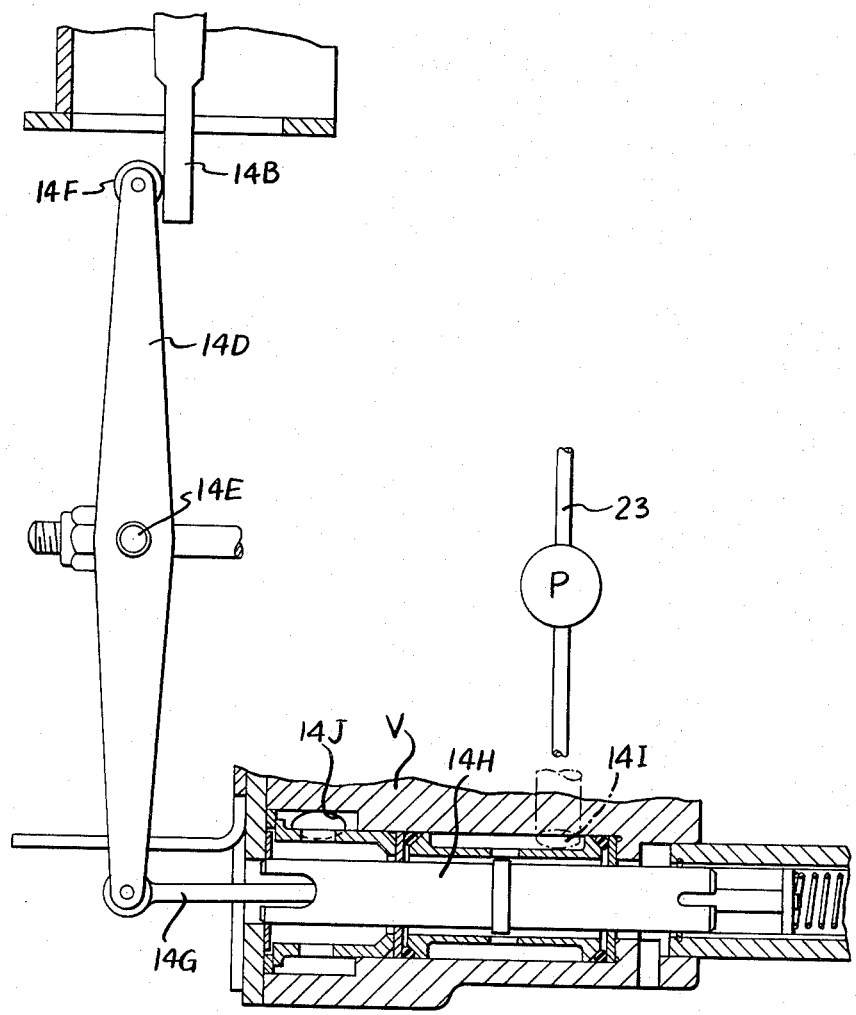
FIG. 2 is a fragmentary longitudinal section taken through the valve housing shown in FIG. 1.

While the invention has been described in connection with a preferred embodiment, it will be understood that it is not intended to limit the invention to the illustrated embodiment but it is, on the contrary, intended to cover the various equivalent and alternative arrangements falling within the spirit and scope of the invention as it is more broadly characterized in the appended claim.

Turning now to the drawings there is shown a portion of a tractor frame F having the usual front and rear wheels (not shown). Centered between the rear wheels is a differential housing D. Trailingly pivoted from the differential housing are a pair of draft links 1 (only one of which is shown) having alined forward pivots A and the usual rear pivots to which the implement is secured. Centered above the trailing draft links is an upper or compression link 2 having a forward pivot 2A and a rear pivot as is conventional.

For the purpose of effecting draft control, i.e., maintenance of a constant draft force on the links 1, under the operating conditions for which the system was originally constructed, use is made of the longitudinal force which is developed in the upper link 2 under draft conditions. Thus the link 2 is normally connected to an upper hitch point 10 on a short drop link 10A which is pivoted to the tractor frame at a pivot 10B.

Turning to the means for supporting the lower draft links, each of the links is provided with a drop link 8 pivoted to respective arms 7 which are secured to opposite ends of a rock shaft 6 journaled in the tractor frame. For rocking the shaft 6, an arm 5 is provided coupled to a main hydraulic actuator A. Such actuator includes a cylinder 3 which is anchored with respect to the tractor frame from which extends a piston rod 4. The arrangement is such that when pressure fluid is admitted through an inlet line 23 from a pump P and valve V the piston moves outwardly, rocking the arm 5 and shaft 6 clockwise thereby swinging the lift arms 7 and connected draft links 1 upwardly and raising the connected implement.

As more fully described in the above Bunting patent, means are provided for alternatively controlling the flow of pressure fluid to the actuator A either to maintain a condition of constant draft force or constant implement depth. Thus, interposed between the point of connection 10 of the upper link and the valve V is a valve linkage 12 including a control rod 9 which extends fore and aft in an extension 19 of the tractor housing and which is surrounded by a coil spring 11. The spring at its rear end is seated on the rod and also with respect to the tractor frame. For seating on the rod, a seating member 9A having an appropriate shoulder thereon is provided and for seating with respect to the frame a screw collar 18 is used, with the clearance between the two members being enclosed by a rubber boot 9B to prevent the entry of foreign material. At the forward end the spring is seated upon a concentric cup 16 which is slidable in a bore 16A and which is normally seated at its lip 16B under spring pressure. Formed on the front end of the rod 9 is a flange 17 which is slidably nested in the cup and which presents a forwardly facing surface.

It will be apparent, then, that the control rod 9 is constrained to an intermediate position. Pressure forwardly applied to the control rod causes unseating of the spring from the collar 18 while application of pressure in the rearward direction causes the cup 16 to be lifted clear from the supporting surface at 16B, the effect in both cases being to compress the spring. For the purpose of transmitting the movement of the control rod 9 into the control linkage, a thrust rod 13 is used, the front end of which is pivoted to a guide arm or carrier 13A having a fixed upper pivot 13B and a lower pivot 13C which mounts a roller 13D. For engaging the roller 13D a cam lever 14 is provided having a pivot point 14A at its forward end which is secured to the upper end of a lever 14B centrally pivoted at 14C. The lower end of the lever 14B is engaged by a second or valve lever 14D having a central pivot 14E and a roller 14F at its upper end. At its lower end the lever 14D is pinned to a valve stem 14G which engages a valve plunger 14H having an inlet 14I and a discharge port 14J.

For the purpose of adjusting the control point, means are provided for adjusting the effective length of the control linkage between the control rod and the valve. In the present instance this is accomplished by providing two opposed cam surfaces on the cam lever 14 and by providing a second roller which is adjustably spaced with respect to the roller 13D coupled to the control rod. Thus there is provided a roller 13E eccentrically mounted at the end of the arm 13F which is connected to a manual control lever 15. The roller 13E thus rides on a first cam surface whereas the roller 13D rides on a second or opposed cam surface. It will be apparent that when the rollers are swung apart by eccentric movement of the roller 13E upwardly, the effect is to increase the length of the control linkage, whereas when the roller 13E is swung downwardly the rollers are free to move inwardly with respect to the cam lever 14 thus shortening the control linkage and changing the control point.

In typical draft operation, with a plow being the connected implement, compression is developed in the upper link 2 (located in position 10) so that the spring 11 is slightly compressed and pressure is developed in the actuator A to hold the plow at an equilibrium depth. However, when the plow strikes a hard patch of ground increasing the draft force, the control rod moves forwardly against the biasing spring causing forward movement of the thrust rod 13 and rocking the levers 14B, 14D, resulting in forward movement of the valve stem 14G to increase the amount of fluid admitted to the pump thereby to increase the pressure applied in the actuator so that the rock shaft 6 is rocked clockwise to lift the draft links 1. This causes the plow to run at a more shallow level. The converse takes place when a sandy patch of ground is encountered in which case the corrective change results in the lowering of the plow so that it runs at a deeper level with the draft force maintained constant.

To operate the device in its position mode in which the implement is kept at a particular level or depth, in spite of changes in draft force, a position feedback device is provided between the rock shaft 6 and the linkage. It is beyond the scope of the present application to describe positioning in detail and reference is made to the above mentioned Bunting patent. It will suffice, for present purposes, to say that the position feedback connection includes a cam surface 6A on the rock shaft 6 which engages rollers (not shown) which form a part of the control linkage 12, the action of the cam surface against the rollers, as the draft links are raised and lowered, serving to restore the valve V constantly to a neutral position. When the device is in its position control mode, the setting of the hand lever determines the depth which the implement will tend to maintain.

In accordance with the present invention novel means are provided for maintaining a predetermined but manually adjustable pressure in the actuator A with the result that the force applied to the rock shaft and hence the upward force applied to the draft links, is maintained constant for transfer, to the tractor, of a constant weight, or vertical loading, from the implement. More specifically, an auxiliary actuator is provided, associated with the control rod, and having an hydraulic connection to the main actuator A, so that a pressure feedback connection is provided between the pressure in the main actuator and the control linkage effective to maintain a predetermined pressure in the main actuator. Thus turning to the drawings I provide an auxiliary actuator 20 at the forward end of the control rod 9 including a cylinder 24 and piston 26, the cylinder being rigidly supported with respect to the tractor frame and the cylinder engaging the flange 17 at the front end of the control rod. Penetrating the cylinder 24 is an hydraulic connection or conduit 21 which is connected to the same line 23 which supplies pressure fluid to the actuator A.

In accordance with one of the more detailed yet important features of the present invention, the cylinder 24 is provided with an integral flange 25 which seats on an annular shoulder 25A which is employed, in the conventional tractor construction, for the seating of a closure disc. An aperture is formed in the flange 25 for passing the thrust rod 13. It is obviously a simple matter for a mechanic skilled in tractor maintenance to remove the disc normally provided and substitute the cylinder and piston assembly 20 under the cup 16 and in the position shown.

Prior to describing the operation of the device with the auxiliary actuator in place, attention may be given to one of the further features of the present invention. Thus I provide at the front end of the conduit 21 a disabling valve assembly 22 having an inlet port 30, a main outlet port 31, an auxiliary outlet port 29, and a sump connection 32, 33, with means for alternatively connecting the auxiliary port to the source of fluid pressure, i.e., to the main actuator, or to the sump. Thus within the valve body there is provided a valve bore 28 and valve piston 27, the latter being connected to an external control button B which is movable forwardly and backwardly through a limited range. When the control button B is moved forwardly (as shown) the sump connection is blocked off and the forward end of the conduit 21 is directly connected to the ports 30, 31; in other words, the main and auxiliary actuators are hydraulically connected together. However, when it is desired to disable the auxiliary actuator, the control button B is pressed to the rear, i.e., inwardly, thereby blocking off communication with ports 30, 31 and connecting the conduit 21 to the sump ports 32, 33. The valve body may be easily installed since it takes the place of the cover plate usually provided and makes use of the same bolted connections.

Where it is desired to use the constant weight transfer feature of the present invention, the upper draft link 2 is disconnected from the position 10 at the rear end of the control rod and is connected to the tractor rear end housing at pivot point 2A. The control button B is pulled out which interconnects the auxiliary actuator 20 to the main actuator via the line 21. Assuming that the hand lever 15 occupies a more or less central position, the control linkage is of such effective length as to crack open the control valve V admitting pressure fluid to the pump P which pressurizes both actuators through the pressure line 23. Application of pressure to the auxiliary actuator 20 causes the piston 26 thereof to move to the left compressing the control spring 11. The resulting leftward movement of the thrust rod 13 acts, through the control linkage, to restore the control valve to its neutral position thus cutting off further flow of pressure fluid at a predetermined equilibrium pressure.

Any tendency for the pressure in the actuator to change is automatically and immediately corrected. Thus upon any slight reduction in pressure from the equilibrium value, the pressure on the control spring will be slightly relaxed causing movement of the thrust rod 13 to the right producing counterclockwise rocking of the valve lever 14D accompanied by slight opening of the valve and feeding of pressure fluid to the actuators to restore the desired pressure. Conversely any tendency for the pressure to increase beyond the equilibrium value causes movement of the thrust rod 13 to the left moving the plunger of the control valve slightly in the opposite direction from neutral producing a corrective reduction in the pressure.

Thus, with the pressure in the system constantly maintained at a preset value, the downward force which may be accepted by the lower links, i.e., the weight transfer, is limited and predetermnied. Where the downward force or weight exceeds that for which the system has been set the lower links 1 simply yield until the excess weight is ground-supported. To increase and decrease the amount of pressure and hence the transferred weight, the hand lever 15 is moved in one direction to a new setting corresponding to a lowered equilibrium pressure while to increase the amount of transferred weight, the hand lever is simply moved in the opposite direction. Since the transferred weight is necessary for full traction, the present scheme provides a novel and convenient way to effect transfer, to the tractor, of just that amount of weight which is required for efficient traction while nevertheless protecting the tractor against the overloading which might be caused by an extremely heavy implement.

To disable the pressure followup connection, the pushbutton B is pushed inwardly which, as stated, cuts off the fluid connection to the line 21 permitting it to drain into the sump. The top link may then be moved into its upper position 10 for regular draft control.

It may be noted that while the added elements bring about a well defined third mode of operation for the system no additional control member is used other than the disabling button. To disable the position control when the pressure or weight transfer control is put into use, the quadrant lever normally provided on the tractor, and the function of which is set forth in detail in the Bunting patent referred to above, is simply moved into its end position. The pressure mode of operation has been achieved by addition of a few, simply formed and inexpensive components to the standard draft position control system. Thus the cylinder 20 of the auxiliary actuator and its integral flange 25 is simply substituted for the conventional disc which underlies the lip of the cup 16. The piston 26 of the actuator projects into space behind the flange 17 of the control rod not previously occupied. Accordingly, the valve block 22 which contains the disabling valve is simply substituted for a cover plate normally included in a tractor of this type. The auxiliary actuator may be installed either at the time of original assembly or as a simple substitution as a conversion kit in tractors already in use.

I claim as my invention:

In a tractor having a frame with trailingly pivoted hitch links, a hydraulic actuator for raising said links upon receiving fluid under pressure, and a control system for the actuator including a valve for controlling fluid flow to and from the actuator and a valve positioning control spring assembly with a rear hitch connection for sensing draft loads and moving the valve in response to spring deflection, the improvement comprising, in combination, a cylinder interposed between the forward end of said spring assembly and said frame, said cylinder being recessed in said frame and opening toward said control spring assembly, a piston fitted into said cylinder, a fluid conduit opening into said cylinder behind said piston so that fluid under pressure delivered by said conduit urges said piston against said spring assembly to cause spring deflection, and a manually operable valve for selectively connecting said conduit to said actuator so that operating the manual valve conditions the control system for either draft load control or weight load control.

References Cited in the file of this patent
UNITED STATES PATENTS

| | | |
|---|---|---|
| 1,371,293 | Brackett | Mar. 15, 1921 |
| 2,627,796 | Bunting | Feb. 10, 1953 |
| 2,859,593 | Brundt | Nov. 11, 1958 |
| 3,073,622 | Merritt | Jan. 15, 1963 |

FOREIGN PATENTS

| | | |
|---|---|---|
| 632,884 | Great Britain | Dec. 5, 1949 |